United States Patent [19]
Staib et al.

[11] Patent Number: 6,152,422
[45] Date of Patent: Nov. 28, 2000

[54] ELECTROMAGNETIC DIRECTIONAL CONTROL VALVE

[75] Inventors: Horst Staib, Schwieberdingen; Wolfgang Rudolph, Gerlingen; Mathias Niebergall, Hemmingen; Lothar Krauter, Bietigheim-Bissingen; Klaus Schudt, Nordheim; Michael Weiss, Stuttgart, all of Germany

[73] Assignee: Robert Bosch GmbH, Stuttgart, Germany

[21] Appl. No.: 09/247,762

[22] Filed: Feb. 9, 1999

[30] Foreign Application Priority Data

Mar. 10, 1998 [DE] Germany .............. 198 10 241

[51] Int. Cl.[7] ............................. F16K 31/06
[52] U.S. Cl. ................ 251/129.15; 251/129.14
[58] Field of Search ............. 251/129.15, 129.14; 335/255, 278, 281; 137/315

[56] References Cited

U.S. PATENT DOCUMENTS 5,752,689  5/1998  Barkhimer et al. ........... 251/129.14 X
5,915,416  6/1999  Okazaki et al. ............... 251/129.14 X

FOREIGN PATENT DOCUMENTS

| 87 04 132 | 7/1987 | Germany. |
| 42 37 681 A1 | 5/1993 | Germany. |
| 93 07 936 | 11/1994 | Germany. |
| 44 16 279 A1 | 11/1995 | Germany. |
| 196 03 383 A1 | 8/1997 | Germany. |

*Primary Examiner*—Kevin Lee
*Attorney, Agent, or Firm*—Michael J. Striker

[57] ABSTRACT

An electromagnetic directional control valve has a magnetic part including a coil body, a coil arrangement of the coil body, a magnetic pole mounted on the coil body, a flux guiding element, and an armature, and a hydraulic part provided with passages and at least one valve which controls a pressure medium flow to the passages, and an outwardly mounted fixing element which fixes the magnetic pole on the coil body.

11 Claims, 2 Drawing Sheets

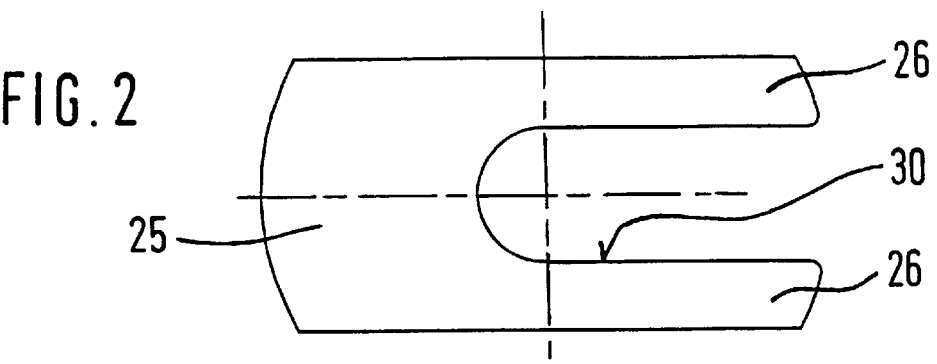
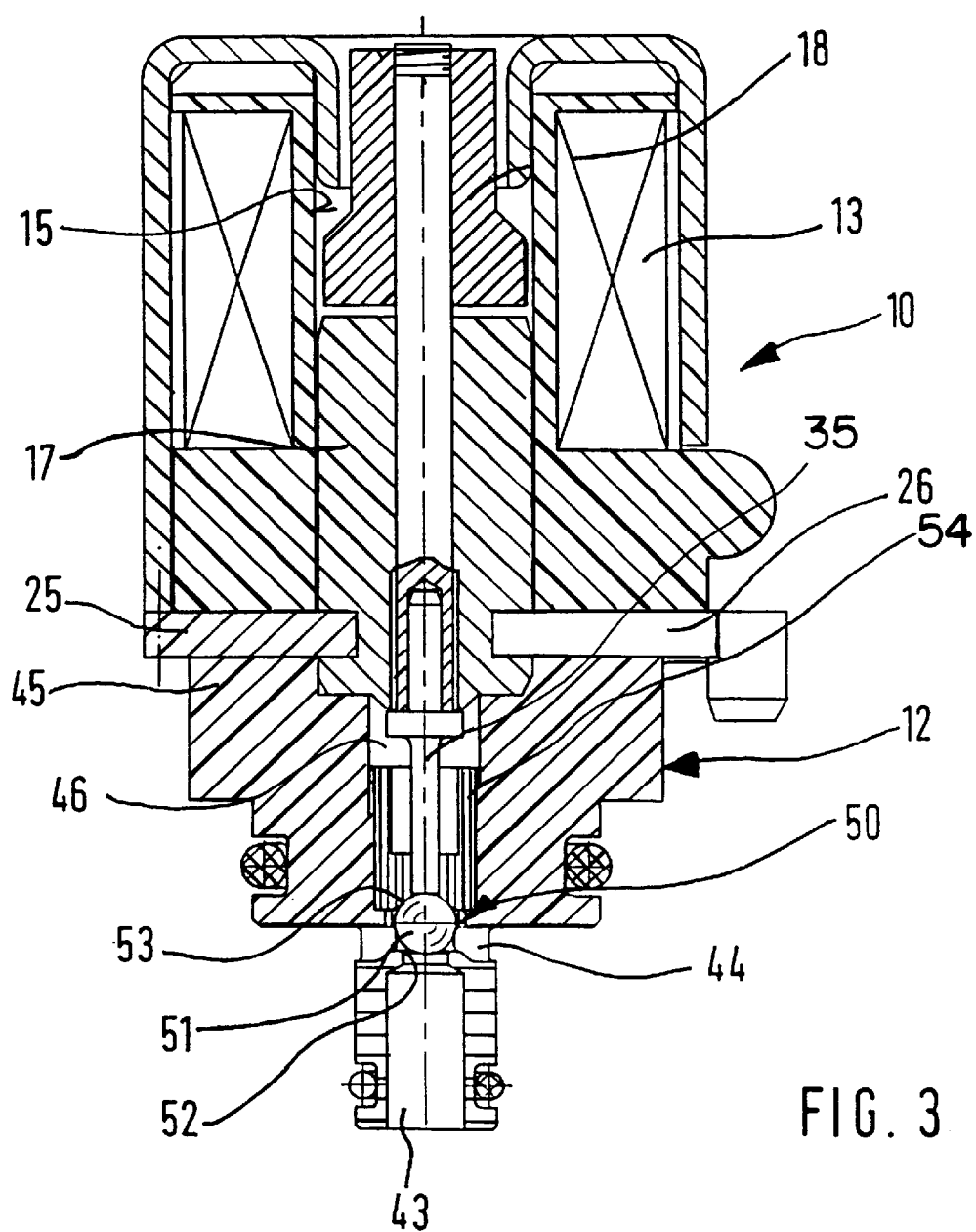

ELECTROMAGNETIC DIRECTIONAL CONTROL VALVE

BACKGROUND OF THE INVENTION

The present invention relates generally to electromagnetic directional control valves.

Such directional control valves are known in many embodiments and used for example in automatic transmissions of motor vehicles, for example to perform a gear change or to adjust pressure level of the pressure medium to the torque of the transmission to be actually transmitted. The directional control valves of this type must satisfy the requirements of an inexpensive construction and at the same time to provide precise and reliable operation over a long operational time.

A directional control valve is disclosed for example in the German patent document DE 42 37 681. This known directional control valve is relatively expensive to manufacture since the pole body and the controlling part are assembled to a single-part structural group which must be machined in a relatively expensive material-removing process. Furthermore, this construction is limited to directional valves which in currentless condition of the coil are closed and can not be transferred without problems to structural variants which are open in the currentless condition.

SUMMARY OF THE INVENTION

Accordingly, it is an object of the present invention to provide an electromagnetic directional control valve, which avoids the disadvantages of the prior art.

In keeping with these objects and others which will become apparent herein after, one feature of present invention resides, briefly stated, in an electromagnetic directional control valve, in which the magnetic pole is mounted on a coil body by an outwardly mountable fixing element.

When the electromagnetic directional control valve is designed in accordance with the present invention, it has an advantage that due to a separate pole group which is fixable by an outwardly mountable fixing element on the coil body, it can be produced in a cost favorable manner with high precision and longer service life.

This is obtained by a hydraulic part which is formed of one-piece with the coil body and can be produced by injection molding of a synthetic plastic. Transverse passages for pressure medium supply can be produced in such a hydraulic part without expensive material-removing working steps. The inventive directional control valve has a small number of components and can be formed with low expenses both as a currentless open valve and a currentless close valve.

Due to the arrangement of the supply, working and return passages, the return of deviated armature by the pressure in the pressure medium is obtained. A return spring for the armature is therefore dispensed with. In addition, no pressure is applied to the guide of the armature, so that a damage by entrained dirt from the pressure medium can be avoided. The same is true for the armature chamber which, due to its separation from the hydraulic circulation, does not come in contact with the pressure medium.

During the manufacturing process of the directional control valve the working air gap of the armature and the valve stroke is obtained by an air gap equalization and due to the relatively low tolerance sizes within narrow limits, so that the inventive directional control valve, despite its inexpensive construction, can be produced with a high precision.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view showing a plug plate as a component in a plan view, of the inventive electromagnetic directional control valve; and FIG. 3 shows an inventive electromagnetic directional control valve in a currentless open embodiment, in a longitudinal section.

DESCRIPTION OF PREFERRED EMBODIMENTS

Figure 1:
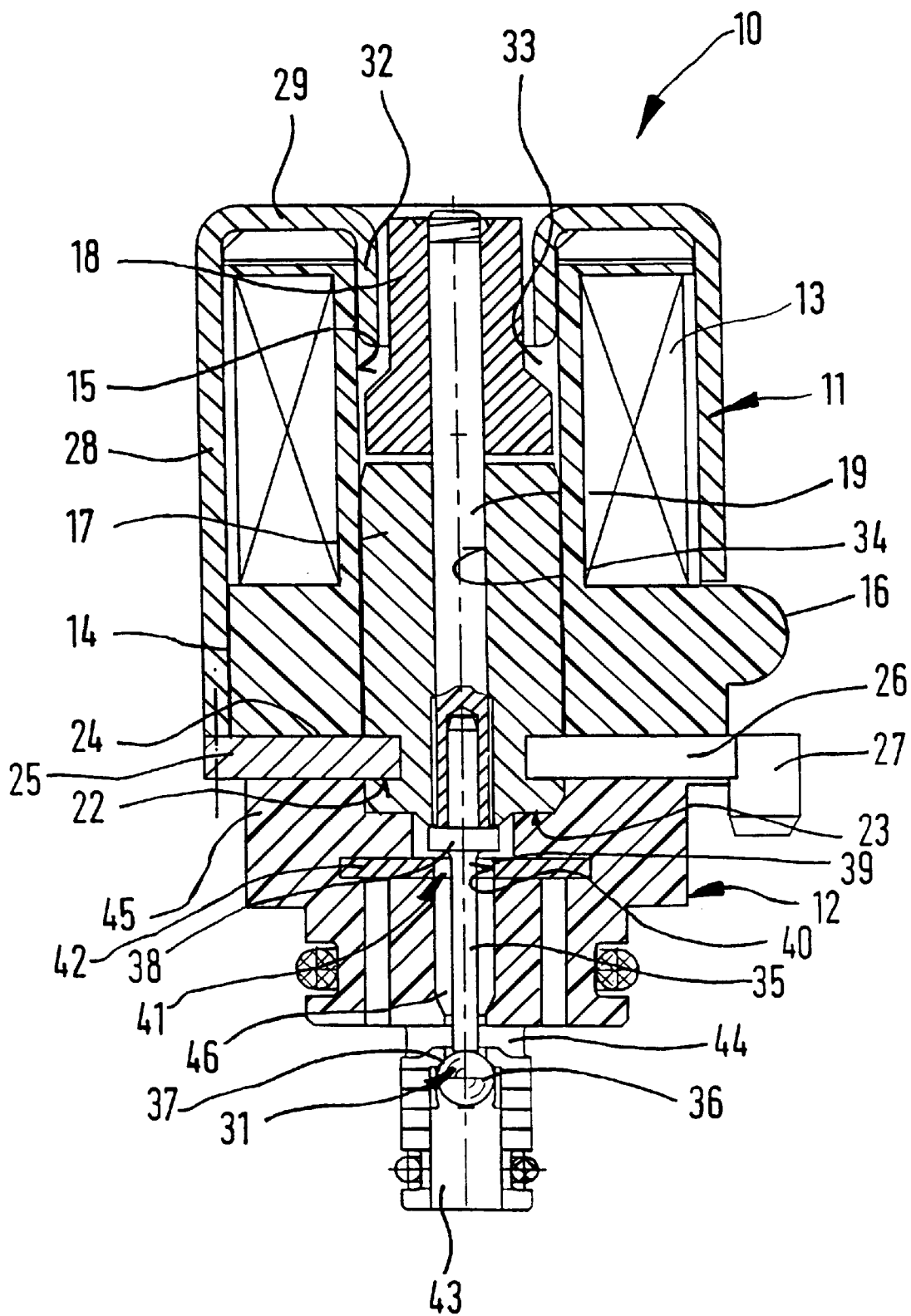
FIG. 1 is a view showing an inventive electromagnetic directional control valve in a currentless closed embodiment; in a longitudinal section.

An electromagnetic directional control valve shown in FIG. 1 can be subdivided into a magnetic part 11 and a hydraulic part 12. The magnetic part 11 is composed of an electrically controllable coil 13 which is wound on a coil body 14. The coil body 14 is produced by injection molding of a synthetic plastic material and is connected of one-piece with the hydraulic part 12 which guides a hydraulic medium in its passages.

An opening 15 extends symmetrically to a longitudinal axis in the coil body 14. The opening 15 is formed as a throughgoing opening which has an inner diameter with multiple steps. A premounted pole group 16 is inserted in the opening 15 and includes a magnetic pole 17, an armature 18 and a bearing pin 19 insertable from outside. The pole group 16 is inserted in the opening 15 until the end of the magnetic pole 17 which faces the hydraulic part 12 abuts against a projection 23 of the opening 15. The opposite second end of the magnetic pole 17 extends shortly under the center in the interior of the coil 13.

The magnetic pole 17 in the region of its first end is provided with a peripheral ring groove 22. The walls of the ring groove 22 coincide in the end position of the magnetic pole 17 with the walls of a slot 24 which is formed in the coil body 14. The slot 24 penetrates the coil body 14 in a radial direction. A return passage 45 extends parallel to the slot 24 at the side facing the hydraulic part 12 and ends in the interior of the coil body 14 as a blind hole.

A plug plate 25 composed of a magnetically conductive material is inserted in the slot 24 from outside as shown in FIG. 2. The plug plate 25 at its end located forwardly in the mounting direction is provided with an axial longitudinal recess 30 shown in FIG. 2, for forming two parallel, interconnected holding claws 26. The longitudinal recess 30 ends substantially in the central region of the plug plate 25 in a radius. The dimensions of the longitudinal openings 30 of the plug plate 25 are determined in correspondence with the size of the slot 24 in the coil body 14 or the dimensions of the ring groove 22 of the magnetic pole 17. The plug plate 25 in the mounted condition engages with its two holding claws 26 the magnetic pole 17 in the region of the ring groove 22, and thereby fixes the same in a definite end position relative to the coil body 14. Simultaneously, the magnetic coil 13 is contacted magnetically by the contact with the plug plate 25.

Two contract tongues 27 are shown in FIG. 1 opposite to the return passage 45. One contact tongue 27 is pressed in the coil body 14 and connected in a not shown manner with the coil 13 to guarantee its voltage supply.

Both ends of the plug plate 25 in its end position extend outwardly beyond the slot 24 of the coil body 14. At least one of the ends is coupled with a bracket-shaped or sleeve-shaped flux conducting element 28 composed of a magnetically conductive material. A reliable magnetic connection is performed preferably by a riveting of both elements with one another. The flux conducting element 28 extends along the longitudinal side of the magnetic part 11, projects in a portion 29 bridging its end side, and ends in a ring-shaped collar 32 which engages in the interior of the coil 13. The collar 32 together with the magnetic pole 17 and the wall of the recess 15 limits a region which is identified as an armature chamber 33.

An armature 18 of the magnetic valve 10 is longitudinally movably guided in the armature chamber 33. The armature 18 has a central bearing pin 19 for its guidance. It is non-releasably connected with the armature 18. The bearing pin 19 extends through a throughgoing axial opening 34 in the magnetic pole 17. At its end located in the interior of the magnetic pole 17, a hardened valve pin 35 is pressed in an opening of the bearing pin 19 and has an outer diameter which is smaller than the bearing pin 19. The free end of the valve pin 35 cooperates with a first valve member 36 of a first valve 31 provided in the hydraulic part 12. The first valve 31 has a valve seat 37 which in a currentless condition of the coil 13, is closed by the valve member 36. A ball can form, for example, the valve member 36 in the shown embodiment.

A first valve 41 which in direction of the magnetic part 11 is arranged over the first valve 31, is formed by a second valve member 38 and a valve seat 39. The second valve member 38 is formed as a collar on the portion of the valve pin 35 which faces the magnetic pole 17. The second valve seat 39 forms a throughgoing opening 40 in an abutment plate 42. The abutment plate 42 is composed of a hardened steel and injection molded as an insert in the hydraulic part 12.

The first valve 31 controls a pressure medium connection between a supply passage 43 which extends in the hydraulic part 12 and is formed by the end portion of the recess 15, and a consumer passage 44 which is arranged transversely to it and intersects the supply passage 43. This pressure medium connection opens in the switching position of the magnetic valve 10, or in other words in the current-supply condition of the coil 13. Simultaneously, the second valve 41 which controls a pressure medium connection between the consumer passage 44 and a return 45, is closed. A pressure medium flow is therefore possible from the supply passage 43 to the consumer passage 44.

The return passage 45 is arranged at the side of the hydraulic part 12 which faces the magnetic part 11 and extends with an axial distance parallel to the consumer passage 44. The connection of the consumer passage 44 with the return passage 45 is performed by a passage portion 46 of the recess 15. The second valve seat 39 is located at the point of opening of the recess 15 into the return passage 45.

The return passage 45 in currentless condition of the coil 13, the first valve member 36 is pressed by the pressure of the pressure medium to the first valve seat 37 and interrupts the pressure medium communication between the supply passage 43 and the consumer passage 44. In this immovable position of the directional control valve 10, the second valve member 38 is lifted from the second valve seat 39, so that a pressure medium can flow out from the consumer passage 44 to the return passage 45. By supplying current or interrupt current supply of the coil 13, the directional control valve 10 is bringable to one of the both switching positions.

FIG. 3 shows a second embodiment of a directional control valve 10, with a magnetic pole 17 which is fixed relative to the coil body 14 by an outwardly mountable plug plate 25 provided with holding claws 26. In contrast to the first embodiment, in the second embodiment, the pressure medium communication between the supply passage 43 and the consumer passage 44 is open in the currentless immovable position of the coil 13 and is closed in the current-suppling switching position. This is performed by a so-called double-seat valve 50 in the hydraulic part 12.

The double-seat valve 50 controls a single valve member 51 which in this embodiment is formed for example as a ball with simultaneously two opposite valve seats 52, 53. The valve member 51 is for this purpose located between both valve seats 52 and 53. The first valve seat 52 is formed on the opening location of the supply passage 43 into the consumer passage 44, while the second valve seat 53 is located at the opening location of the consumer passage 44 into the canal portion 46 formed in the throughgoing opening 15 and connecting the consumer passage 44 with the return passage 45. The second valve seat 53 is formed on a seat sleeve 54 which is pressed in the canal portion 46.

The valve pin 35 extends through the seat sleeve 54 and has an outer diameter which is smaller than an inner diameter of the seat sleeve 54. The valve member 51 abuts against the free end of the valve pin 35. The valve member 51 is pressed by the pressure from the supply passage 43 against the second valve seat 53 and thereby hydraulically blocks the return passage 45. In currentless condition of the coil 13, the magnetic pulling force between the armature 18 and the magnetic pole 17 activates a force acting on the valve member 51, so that the valve member 51 is pressed against the pressing force of the flowing pressure medium to the first valve seat 52. The consumer passage 54 is now hydraulically coupled with the return passage 45 through the passage portion 46.

It is to be understood that changes or modifications of the above described embodiments are possible as well, without department from the spirit of the present invention. It should be mentioned that the use of a hardened valve pin 35 or an abutment plate 42 is provided when a specially wear-resistant directional control valve 10 is needed. When, however, such requirements are not applicable, the bearing pin 12 can be extended in one piece along the length of the valve pin 35, or the abutment plate 42 can be completely dispensed with.

It will be understood that each of the elements described above, or two or more together, may also find a useful application in other types of constructions differing from the types described above.

While the invention has been illustrated and described as embodied in electromagnetic directional control valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An electromagnetic directional control valve, comprising a magnetic part including a coil body, a coil arranged on said coil body, a magnetic pole mounted on said coil body, a flux conducting element, and an armature;

a hydraulic part provided with passages and at least one valve which controls a pressure medium flow to said passages; and a fixing element which is mountable from outside and fixes said magnetic pole on said coil body.

2. An electromagnetic directional control valve as defined in claim 1, wherein said fixing element is composed of a magnetically conductive material and magnetically conductively connected with said flux guiding element of said magnetic part.

3. An electromagnetic directional control valve as defined in claim 2; and further comprising riveting means which magnetically conductively connect said fixing element with said flux guiding element.

4. An electromagnetic directional control valve as defined in claim 1, wherein said coil body and said hydraulic part are formed as a single one-part component of a synthetic plastic material which is injection moldable.

5. An electromagnetic directional control valve as defined in claim 1, wherein said magnetic part and said hydraulic part form the electromagnetic directional control valve as a three/two directional control valve.

6. An electromagnetic directional control valve as defined in claim 1, wherein said at least one valve of said hydraulic part is formed as a ball seat valve.

7. An electromagnetic directional control valve, comprising a magnetic part including a coil body, a coil arranged on said coil body, a magnetic pole mounted on said coil body, a flux conducting element, and an armature;

a hydraulic part provided with passages and at least one valve which controls a pressure medium flow to said passages; and a fixing element which is mountable from outside and fixes said magnetic pole on said coil body, said fixing element being formed as an inert plate with a longitudinal opening which is open at least at one end.

8. An electromagnetic directional control valve, comprising a magnetic part including a coil body, a coil arranged on said coil body, a magnetic pole mounted on said coil body, a flux conducting element, and an armature;

a hydraulic part provided with passages and at least one valve which controls a pressure medium flow to said passages; and a fixing element which is mountable from outside and fixes said magnetic pole on said coil body, said coil body having a radially outwardly leading recess in which said fixing element is insertable, said magnetic pole having a ring groove which in a mounted condition of said magnetic pole coincides with said opening.

9. An electromagnetic directional control valve, comprising a magnetic part including a coil body, a coil arranged on said coil body, a magnetic pole mounted on said coil body, a flux conducting element, and an armature;

a hydraulic part provided with passages and at least one valve which controls a pressure medium flow to said passages; and a fixing element which is mountable from outside and fixes said magnetic pole on said coil body, said coil body having a radially outwardly leading recess in which said fixing element is insertable, said magnetic pole having at least two oppositely located groove portions which in a mounted condition of said magnetic pole coincide with said opening.

10. An electromagnetic directional control valve as defined in claim 9, wherein said recess is formed as a slot.

11. An electromagnetic directional control valve as defined in claim 9, wherein said recess is formed as a slot.

* * * * *